(12) United States Patent
Hsu et al.

(10) Patent No.: US 6,871,959 B2
(45) Date of Patent: Mar. 29, 2005

(54) LIGHT CUT FOR PROJECTOR

(75) Inventors: Nien-Hui Hsu, Hsin-Chu (TW); Sheng-Yi Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 10/248,789

(22) Filed: Feb. 19, 2003

(65) Prior Publication Data

US 2003/0156263 A1 Aug. 21, 2003

(30) Foreign Application Priority Data

Feb. 20, 2002 (TW) .................................. 91202230 U

(51) Int. Cl.[7] .................. G03B 21/18; G03B 21/16; G03B 21/20; G03B 21/28; F21V 29/00
(52) U.S. Cl. .................. 353/57; 353/61; 353/85; 353/98; 362/264; 362/294; 362/373
(58) Field of Search ............................. 353/57, 61, 85, 353/87, 98; 315/362; 362/264, 294, 373

(56) References Cited

U.S. PATENT DOCUMENTS

| | | | | | |
|---|---|---|---|---|---|
| 3,120,928 A | * | 2/1964 | Gotze | ..................... | 362/294 |
| 3,978,361 A | * | 8/1976 | Hiramoto | ..................... | 313/35 |
| 4,222,094 A | * | 9/1980 | Wolar | ..................... | 362/279 |
| 6,004,010 A | * | 12/1999 | Inage et al. | ..................... | 362/294 |
| 6,312,137 B1 | * | 11/2001 | Hsieh | ..................... | 362/96 |
| 6,402,346 B1 | * | 6/2002 | Liao et al. | ..................... | 362/294 |
| 6,575,599 B1 | * | 6/2003 | Imamura et al. | ..................... | 362/294 |
| 6,742,899 B1 | * | 6/2004 | Wu et al. | ..................... | 353/61 |
| 2003/0063464 A1 | * | 4/2003 | Guliksen | ..................... | 362/294 |
| 2004/0032737 A1 | * | 2/2004 | Hsu et al. | ..................... | 362/294 |

* cited by examiner

*Primary Examiner*—Judy Nguyen
*Assistant Examiner*—Magda Cruz
(74) *Attorney, Agent, or Firm*—Winston Hsu

(57) ABSTRACT

The present invention provides a fan to generate airflow passing around a lamp reflector. A wake region is formed near a leeward surface of the lamp reflector, and a light cut is installed in the wake region. The light cut has a fixing end and is fixed on a side end surface of a lamp holder of the lamp by means of fastening bolts, the other end keeps a selected distance away from the lamp reflector and has a suitable distance along contours of the lamp reflector toward a rear end of the lamp reflector so as to prevent the light with high illumination going through the lamp reflector to the exhausting outlet for avoiding light leakage; hence, the exhausting outlet shall not be added inclined louvers and the windage is lowered down comparatively.

5 Claims, 4 Drawing Sheets

LIGHT CUT FOR PROJECTOR

BACKGROUND OF INVENTION

1. Field of the Invention

The present invention relates to a projector. More specifically, the present invention relates to a light cut for a lamp of a projector.

2. Background of the Invention

As the science being developed to another stage, projectors are applied to variable fields, such as the consumption products to high technology products; the application range is being expanded continuously. For instance, the exhibitions for big conference rooms or commercial projecting screens or televisions, all are to cooperate with the presentation contents for instantly showing. Projectors are specially designed for high illumination and clear images on a screen, therefore audiences may acquire a comfortable environment to view. Hence, it is known that such projectors adopt high-power lamps to approach the purposes aforesaid. However, the problem accompanying with the high-power lamp is theventilation for heatgenerating from the lamp. In prior art, an exhausting fan is designed to cool the heat, but the noise produce as well, and an exhausting outlet may let light escapes out of the projector. According to aforesaid, how to effectively block light and reduce noise, further to increase a heat-dissipating rate of the lamp become an important issue for researching and developing in the relevant fields.

Referring to FIG. 1, which shows a lamp 10 and an exhausting outlet louver 11. Generally the lamp 10 consists of a lamp reflector 101 and a burner 102. Due to the burner 102 emitting high illumination for light source, two ways are to approach the purpose of high illumination, one is to adopt the lamp 10 with high-power, the other one is to cover a layer with a high reflection rate by way of electroplating or coating on the interior surface of the lamp reflector 101 to reflect the light emitted from the burner 102. Nevertheless, the partial light from the burner 102 still goes through the lamp reflector 101 to scatter, even the whole lamp 10 is located in the interior of projector and enveloped by a casing. On the other hand, to cool the lamp 10 may have an exhausting fan 12 and an exhausting outlet for draining out heating air. The exhausting outlet 11 is then designed to be placed below the lamp 10, and plural inclined louvers 111 are added on the exhausting outlet 11 to block the light through the lamp reflector 101 going toward the exhausting outlet 11 for preventing escape of the light, but the windage for the exhausting outlet 11 is increased to cause the interference of cooling air moving out, thus the efficiency of heat dissipating is lowered. Along with the condition in prior arts, the only way to figure out the problem is to enhance the fan 12 speed to keep the heat-dissipating efficiency in a good stage; on the other hand, the increase of the noise and the decrease of the fan's life are inevitably produced.

SUMMARY OF INVENTION

The first object of the present invention is to providea light cutfor projector for blockingthe light emitting onto an exhausting outlet to prevent the light escaping out of the projector and promote the projection image quality.

The second object of the present invention is to provide a light cut for projector capable of diminishing the windage around the exhausting outlet, and increasing the airflow for enhancing heat-dissipating efficiency.

The third object of the present invention is to provide a light cut for projector capable of successfully dropping off heat loading of the projector forlowering the operating temperature and rotation speed of components. Thus extending products life and reducing noise.

To approach above objectives, the present invention provide a fan to generate airflow to pass around a lamp reflector with an organized figure of column and cone. A wake region is formed on a leeward surface of the lamp reflector, and a light cut is installed on the wake region. The light cut has a fixing end and is fixed on a side end surface of a lamp holder of the lamp by means of fastening bolts, the other end keeps a selected distance away from the lamp reflector and has a suitable distance along contours of the lamp reflector toward a rear end of the lamp reflector so as to that to prevent the light with high illumination going through the lamp reflector to the exhausting outlet for avoiding light leakage; hence, the exhausting outlet shall not be added inclined louvers and the windage is lowered down comparatively.

For your esteemed reviewing committee members to understand and recognize the invention, a detailed description matched with corresponding drawings is presented as follows.

DETAILED DESCRIPTION

Figure 1:
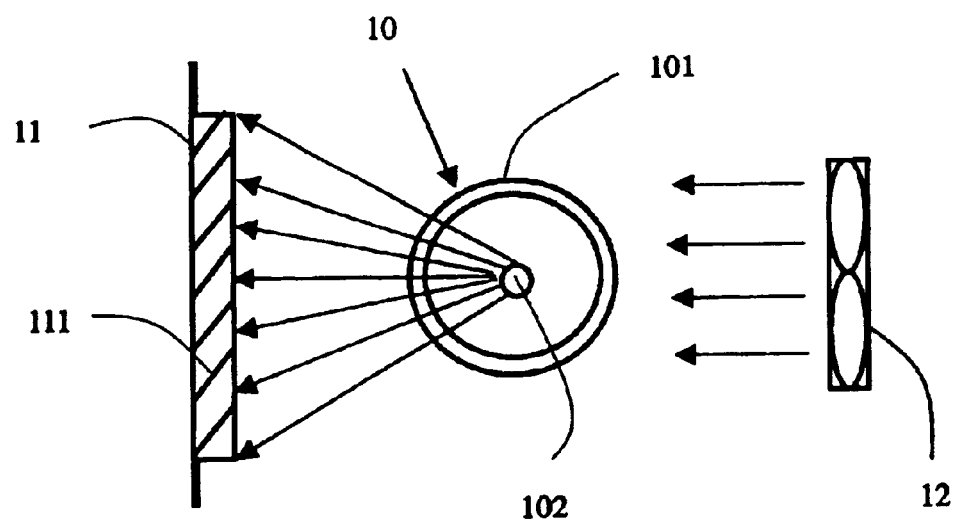
FIG. 1 is a relative position view of a lamp and an exhausting outlet of a projector in prior art.
Figure 2:
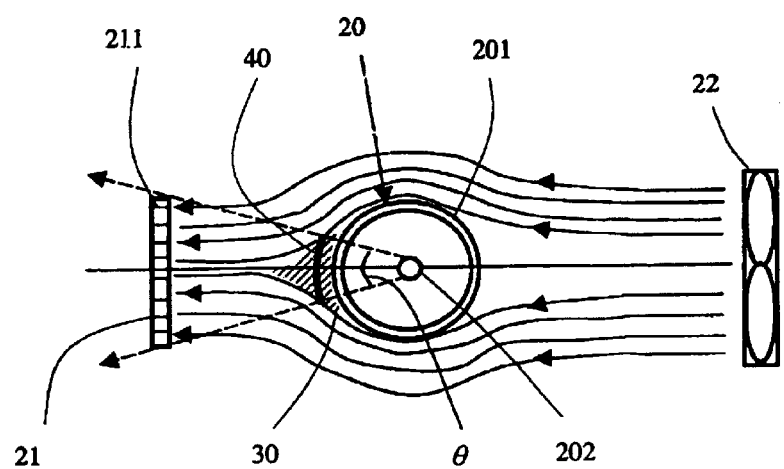
FIG. 2 is a schematic diagram of flow distribution of periphery of a lamp of a projector of the present invention.

Please refer to FIG. 2, which is a schematic diagram of flow distribution of periphery of a lamp of a projector of the present invention. Wherein around a side of a lamp 20 is an exhausting outlet 21, which has a louver 211; the other side of the lamp 20 is mounted a fan 22. A lamp reflector 201 with a similar column and cone figure. When the rotating speed of the fan 22 raises up to a certain load, an airflow distributes around the louver 211 on the side of the lamp 20.

Figure 3:
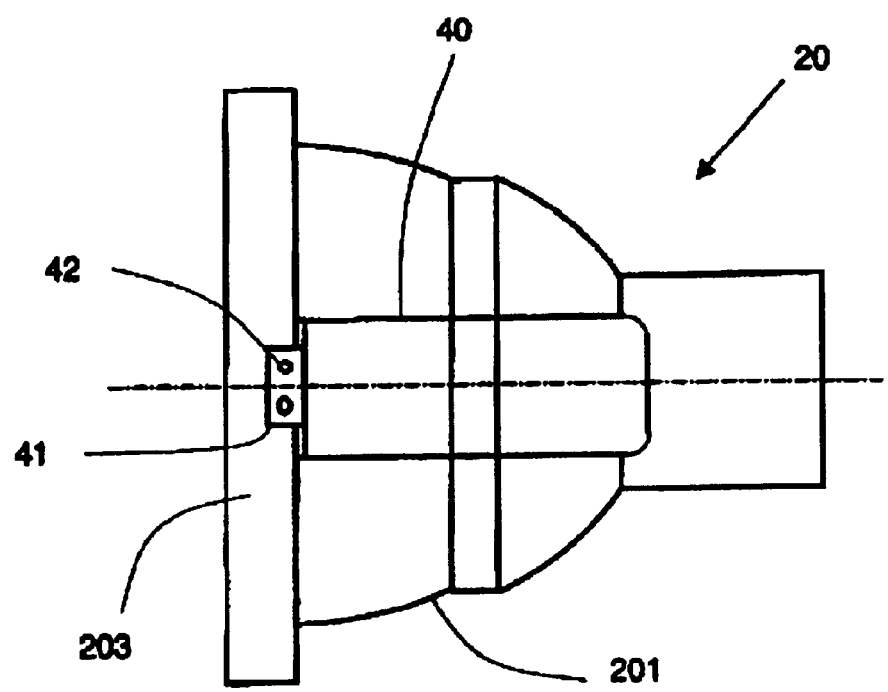
FIG. 3 is a view of a light cut for projector of the present invention.
Figure 4:
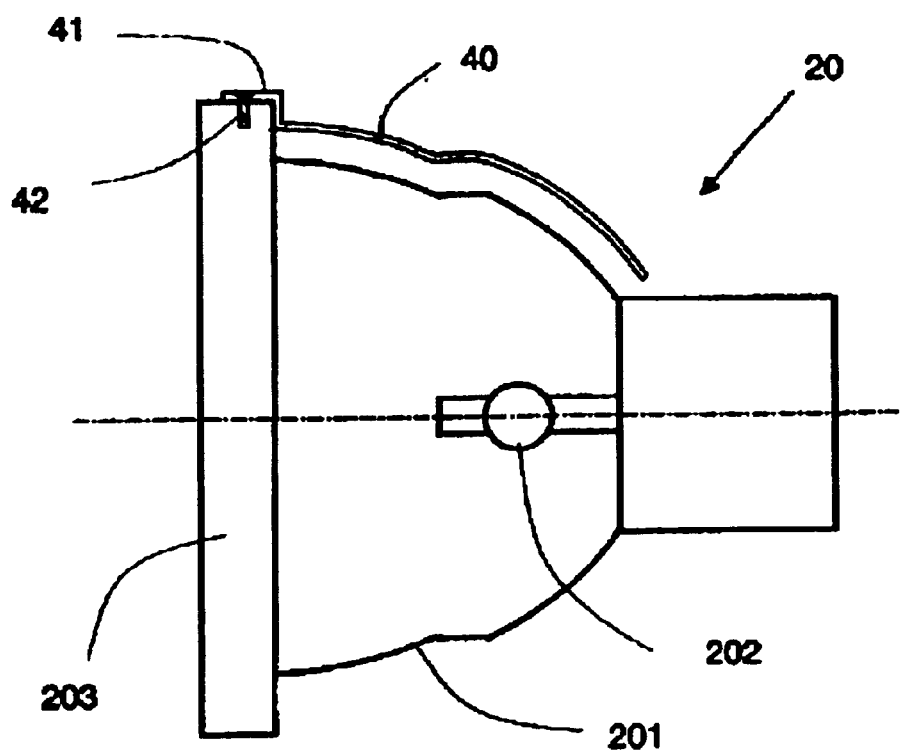
FIG. 4 is a sectional view of the light cut of the lamp of the present invention.

Depending on a flow distributed of a streamline form of hydrodynamics, a wake region 30, represented by plural inclined lines in FIG. 2, is formed on the leeward surface. Due to almost no airflow in the wake region 30, the affect for heat dissipating of the lamp 20 is comparatively small; hence a light cut 40 is mounted on the wake region 30. A width of the light cut 40 is determined by a suitable blocking angle θ, therefore the light emit from a burner 202 through the lamp reflector 201 to an exhausting outlet 21 is interrupted by the light cut 40 for avoiding light escapes out of the projector. Besides, as shown in FIGS. 3 and 4, a fixing end 41 of the light cut 40 is fastened by bolts 42 on a side end surface of a lamp holder 203 of the lamp 20, the other end of the light cut 40 keeps a selected distance away from the lamp reflector 201 and has a suitable distance extends along contours of the lamp reflector 201 toward a rear end of the lamp reflector 201 for preventing the light from leaking. Furthermore, by ways of adjusting the distance of the light cut 40 and the lamp reflector 201, the distance of the light cut 40 moving backward and the dimensions of the light cut 40 are capable of suiting the exhausting outlet 21 with variable sizes.

The present invention has the light cut 40, which is located in the wake region 30 of the leeward surface of the lamp reflector 201, and the light cut 40 has no interference with the airflow from the fan 22, thus the cooling efficiency for the lamp is not changed. Furthermore, the light cut 40 firstly blocks the light with high illumination emitted by the burner 202 on the location close to the lamp reflector 201, therefore the exhausting outlet 21 of the present invention is not necessarily installed inclined louver 211 but another direction of the louver 211 along streamline form so as to that decreasing the windage of the exhausting outlet 21, and then the airflow blown by the fan 22 is passing and cooling the lamp reflector 201 and smoothly exhausted out of the projector for promoting the cooling efficiency of the fan 22. The rotating speed and the noise of the fan 22 are suitably reduced, simultaneously, the heat loading of the projector is reduced as well to lower down the operating temperature of components, and therefore extending the life of the life to assure products quality.

Similarly, the light cut 40 is able to cooperate with the inclined light-blocking design of the louver 211 of the exhausting outlet 21 to suit a larger exhausting outlet 21 with more cooling capacity. A light-blocking part of the light cut 40 whose louver adopts an arrangement along an airflow direction; a part without light-blocking of the light cut 40 accepts the inclined louver 211 to function light-blocking for lowering the windage of the exhausting outlet 21. Because the airflow speed of the wake region 30 is tiny, basically to reach better light-blocking and heat-dissipating effects, such as the blocking angle θ of the light cut 40 is 120°, the part for the wake region 30 is neglected; besides, it is still within the scope of the present invention.

Moreover, the preferable embodiment described in above section is to illustrate the invention in a detailed way and is not limitation to the scope of the invention. Those who are skilled in such arts should understand that their appropriate and slight variation and modification still keep the merits of the invention and are also within the spirit and scope of the invention.

What is claimed is:

1. A light cut for a lamp of a projector comprising:

a fan for producing airflow;

a lamp having a lamp reflector and a burner and located in the airflow, wherein a wake region is formed opposite a side surface, which faces the airflow, of the lamp;

one light cut located in the wake region; and one exhausting outlet corresponding to the light cut, the airflow after flowing passing around the lamp reflector flowing into the exhausting outlet;

wherein the light cut blocks light emitted from the burner through the lamp reflector to the exhausting outlet and does not disturb the airflow.

2. The light cut of claim 1, wherein the exhausting outlet comprises a louver along the airflow.

3. The light cut of claim 1, wherein the lamp further comprises a lamp holder, the light cut fastened on the lamp holder.

4. The light cut of claim 1, wherein a blocking angle θ using the burner as a vertex and the light cut as a opening range is greater than zero degree and smaller than 120 degree.

5. The light cut of claim 1, wherein the light cut is adjacent to the lamp reflector and extends along contours of the lamp reflector.

* * * * *